May 10, 1966   L. J. PIANOWSKI ET AL   3,250,369
PUSHER MECHANISM FOR CONVEYOR APPARATUS
Filed June 5, 1964   4 Sheets-Sheet 1

INVENTORS.
Leon J. Pianowski.
Gasper J. Latona.
BY
Barnes, Dickey & Pierce
ATTORNEYS.

May 10, 1966 L. J. PIANOWSKI ET AL 3,250,369
PUSHER MECHANISM FOR CONVEYOR APPARATUS
Filed June 5, 1964 4 Sheets-Sheet 2

INVENTORS.
Leon J. Pianowski.
Gasper J. LaForra.
BY
Harness, Dickey & Pierce
ATTORNEYS

FIG. 3.

United States Patent Office 3,250,369
Patented May 10, 1966

3,250,369
PUSHER MECHANISM FOR CONVEYOR APPARATUS
Leon J. Pianowski and Gasper J. Latona, Detroit, Mich., assignors to The Udylite Corporation, Warren, Mich., a corporation of Delaware
Filed June 5, 1964, Ser. No. 372,904
8 Claims. (Cl. 198—19)

The present invention broadly relates to conveying machines, and more particularly to an improved transfer mechanism for use on conveying machines of the type suitable for automatically transferring workpieces through a series of treating stations such as encountered in electroplating operations or the like. More specifically, the present invention is directed to an improved reciprocable transfer mechanism incorporating an independently reciprocable section for use in conveying machines of the general type disclosed in Uinted States Patents, 2,591,681, granted April 8, 1952; Re. 24,072, granted October 11, 1955; and 3,794 granted March 13, 1962, all of which are assigned to the same assignee as the present invention. The present invention is also directed to an improved skip and/or delayed dip rail section movable independently of the machine elevator chassis and in operative association with the reciprocable transfer section.

In conveying machines of the general type disclosed in the aforementioned United States patents, a plurality of work carriers having workipeces supported therefrom are movably suspended from a rail and are intermittently advanced therealong through a series of treating stations. The work supporting rails are conventionally arranged in two substantially straight side sections connected at one or both of their ends by an arcuate turn around rail section. A reciprocable pusher type transfer mechanism operates in timed sequence for intermittently moving the work carriers and workpieces suspended therefrom along the rails and the workpieces are periodically lifted in order that they can be advanced over partitions or other obstructions between adjoining treating stations. Conventionally, an elevator chassis is provided which is coextensive with the circuitous path of travel of the workpieces and is movable in a vertical direction to and from a raised position and a lowered position. Sections of the workpiece supporting rail are secured to the chassis whereby workpieces supported thereon are raised and lowered in response to the ascending and descending movement of the chassis. Other rail sections may be affixed to the machine frame at a low position wherein workpieces supported thereon are immersed in the treating solutions disposed directly below the fixed rail sections. The reciprocable pusher mechanism is conventionally mounted on the elevator chassis and is operative to advance workpieces along the movable rail sections when the chassis is in the raised position and to also advance workpieces along the lower fixed rail sections when the chassis is in the lowered position.

It is frequently desirable to provide for variations in the treating sequence of individual workpieces as they are conveyed along the supporting rail providing thereby increased flexibility and versatility in the processing machine. In such instances, one or more sections of the work supporting rail are movable independently of the elevator chassis so as to provide a delay-dip or early-pickup operation or, alternatively, sections are selectively retained in the elevated position providing therewith a skip operation. In such event, an interference relationship is created between the pusher mechanism supported by the elevator chassis and positioned above the independently movable or fixed elevated rail sections. It is accordingly necessary in such constructions to provide a segmented or multiple pusher mechanism to avoid interference between the ascending and descending movement of the elevator chassis and the independently movable or fixed rail sections. Various mechanisms have heretofore been used or proposed for use to maintain continuity of the transfer mechanism along those vertically fixed or independently movable rail sections which cause obstruction and interference with the normal operation of the machine. One solution to this problem is disclosed in United States Patent No. 3,024,794 hereinabove referred to.

While the mechanisms heretofore used or proposed for use have provided satisfactory operation in most instances, the mechanisms heretofore proposed have been relatively complex necessitating the use of secondary drive means for achieving synchronized movement between the principal transfer mechanism and an auxiliary transfer mechanism located along those rail sections causing obstruction. Problems have also been presented by the mechanisms heretofore used or proposed for use in providing for selective independent movement of the rail sections which provide for delay-dip and skip operation. The present invention also provides a simplified structure overcoming the problems heretofore presented.

It is accordingly a principal object of the present invention to provide an improved transfer mechanism which maintains continuity in the intermittent advancement of work carriers along the entire work supporting rail and overcomes the problems inherent in auxiliary transfer mechanisms of the types heretofore known.

Another object of the present invention is to provide an improved reciprocable pusher-type transfer mechanism incorporating an independently movable pusher section which is readily coordinated and synchronized with the advancing movement of the principal transfer mechanism.

Still another object of the present invention is to provide an improved reciprocable auxiliary pusher-type tranfer mechanism for use on a conveying machine which is advanced in response to the advancing movement of the principal transfer mechanism and is moved to the retracted position in response to the vertical travel of the elevator chassis avoiding the necessity of employing secondary drive means and attendant control means for assuring synchronous operation thereof.

A further object of the present invention is to provide an improved conveying machine incorporating a segmented pusher-type transfer mechanism which is of simple design, of durable and reliable operation, and of simple and economical manufacture.

Yet still another object of the present invention is to provide an improved mechanism for providing vertical travel of a rail section independently of the movement of the elevator chassis of the machine and which can readily be drivingly coupled to the retracting mechanism of the associated pusher mechanism.

The foregoing and other objects and advantages of the present invention are achieved by providing a conveying apparatus including a framework having an elevator chassis movably mounted thereon which is intermittently movable to and from a raised position and a lowered position. A series of rail sections are mounted on the framework and on the elevator chassis on which a series of work carriers are movably mounted and are intermittently advanced therealong through a series of treating stations by means of a reciprocable pusher mechanism. The pusher mechanism consists of a first section which is reciprocably mounted on the elevator chassis and a second section which is reciprocably mounted in a vertically fixed position on the framework and is adapted to fit in a gap formed in the first pusher section when the chassis is in one of its moved positions. Drive means are provided which are operative to effect reciprocation of the first pusher section to and from an advanced position and a retracted position and for moving said second pusher section from the retracted to the advanced position when the first and second sections are in end abutting alignment relative to each other. Retraction of the second pusher section is achieved independently of the first pusher section by coacting means connected to the second section and to the elevator chassis which is operable to effect independent retraction of the second section in response to the vertical travel of the chassis.

In accordance with the foregoing arrangement positive mechanical coordination between the retracting movement of the second section and the operating cycle of the conveying machine is attained without the necessity of incorporating ancillary control equipment and secondary drive means thereby providing for a simplicity in construction and operation of the machine and a corresponding increase in its reliability and reduction in the susceptibility of malfunction thereof.

A further feature of the present invention relating to an improved mechanism for providing controlled movement of an independently movable rail section in the use of a fluid cylinder in which fluid is entrapped preventing a lowering thereof until the fluid is permitted to escape therefrom at a controlled rate providing a gravitational descent of the rail section to the lowered position. The rail section is subsequently raised in response to the ascending movement of the elevator chassis by drive means operatively connected to the pusher section retracting mechanism.

Other objects and features of novelty of the invention will be specifically pointed out or will become apparent when referring, for a better understanding of the invention, to the following description taken in conjunction with the accompanying drawings, wherein.

Figure 1:
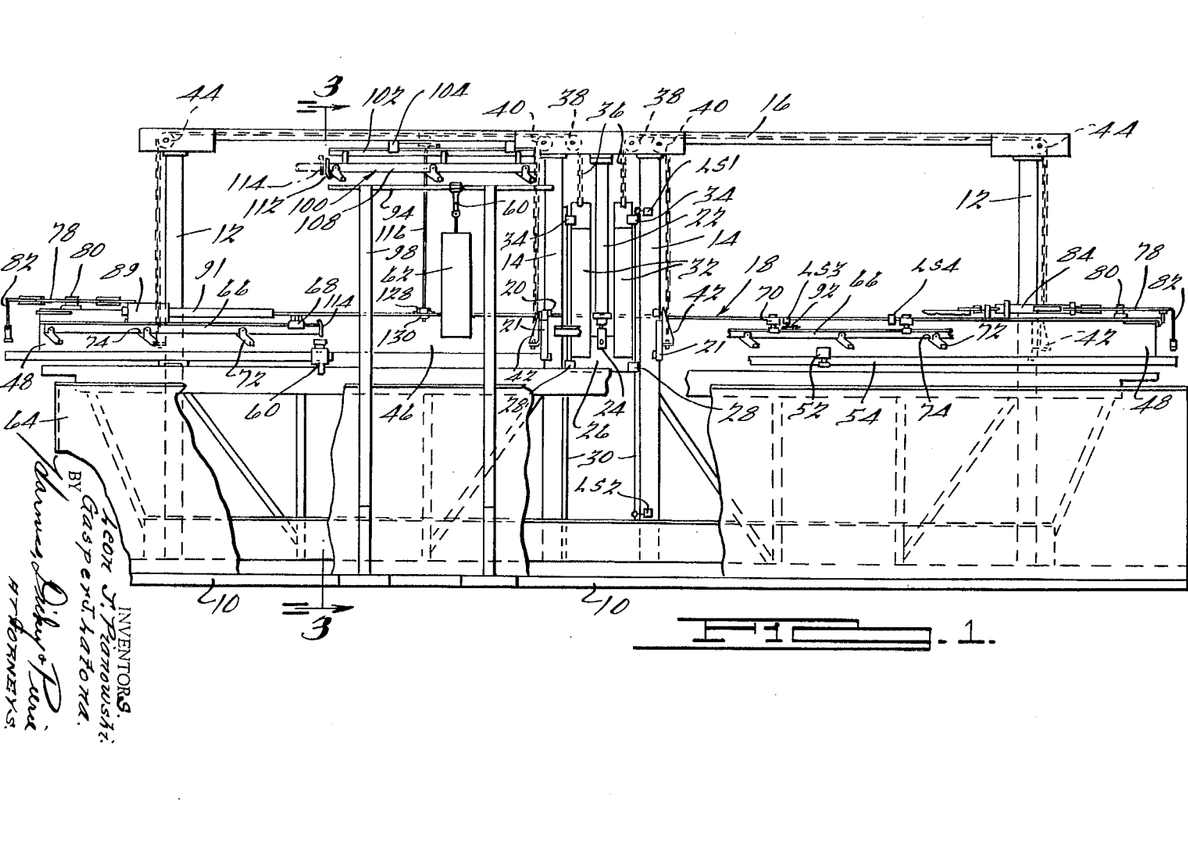
FIGURE 1 is a side elevational view of a typical conveying machine constructed in accordance with the preferred embodiments of the present invention and with portions thereof broken away for the purposes of clarity.
Figure 2:
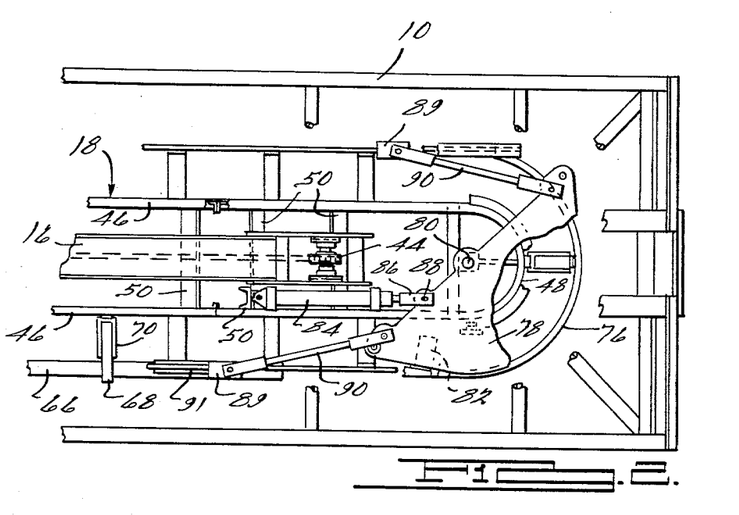
FIGURE 2 is a fragmentary plan view of the right end of the machine as viewed in FIGURE 1 and illustrating in particular the drive means for effecting reciprocation of the pusher mechanism.
Figure 3:
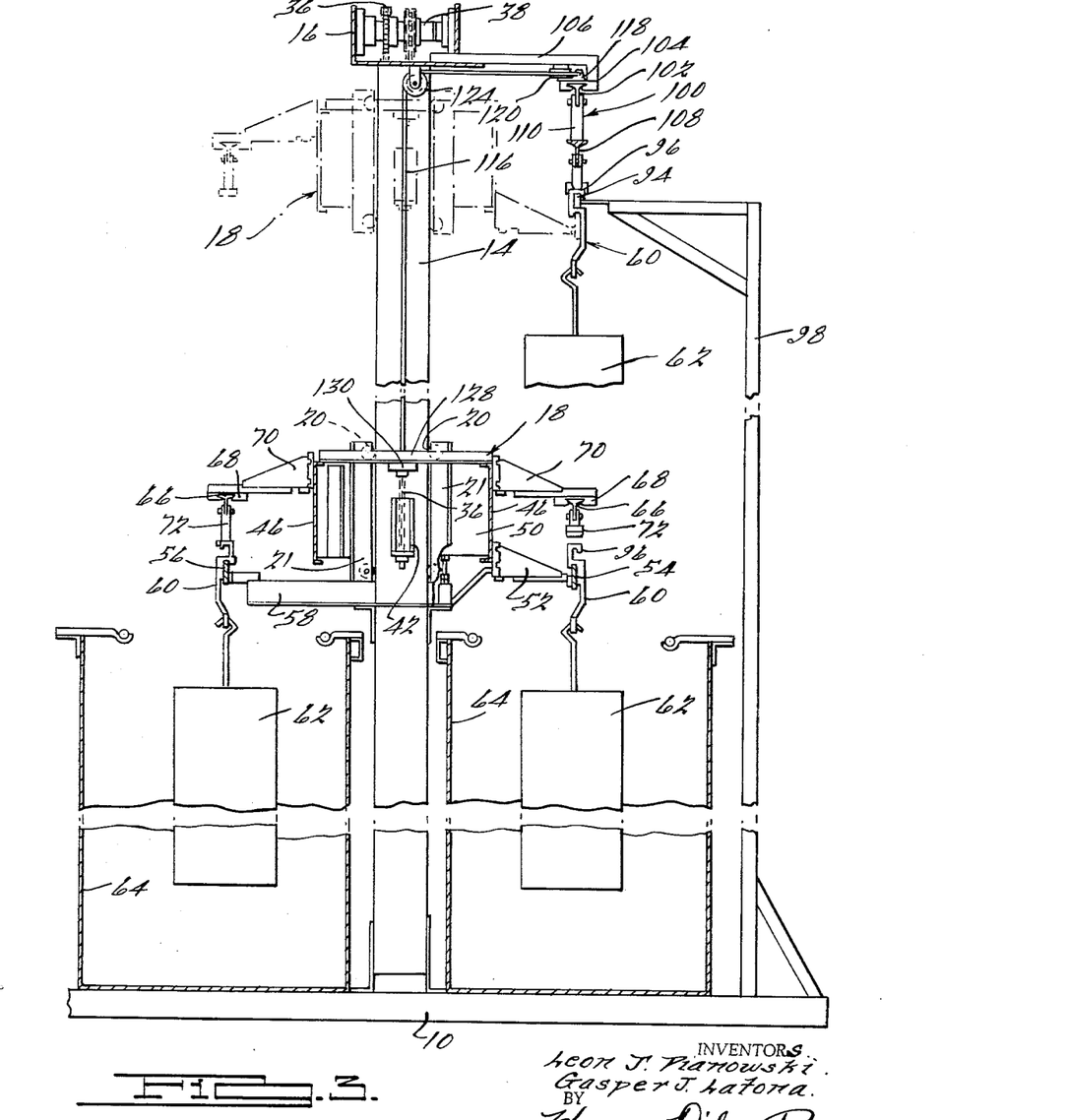
FIGURE 3 is a transverse vertical sectional view of the conveying machine shown in FIGURE 1 and taken along the line 3—3 thereof.

Referring now in detail to the drawings and as may be best seen in FIGURES 1–3, a conveying machine of the type which the present invention is applicable, comprises a framework consisting of base beams 10 which form a platform for a series of vertical columns including end columns 12 and intermediate columns 14 which are interconnected at the upper ends thereof by a longitudinal beam 16. An elevator chassis 18 is movably and guidably supported on the end columns 12 and intermediate columns 14 for vertical movement to and from a raised position as shown in phantom in FIGURE 3, to a lowered position as shown on solid lines in FIGURES 1 and 3. Guided vertical travel of the elevator chassis is achieved by a series of rollers 20 mounted on brackets 21 disposed in rolling bearing contact with the side surfaces of the vertical columns.

Movement of the elevator chassis to and from the lowered position and the raised position is achieved by a hydraulic double-acting lift cylinder 22 as best seen in FIGURE 1 having the closed or blank end thereof affixed to the longitudinal beam 16 and having the rod end thereof projecting downwardly and centrally of the intermediate columns 14. The end of the piston rod 24 of the hydraulic cylinder 22 is affixed to a crosshead 26 formed with a pair of diametrically disposed shoes 28 which are disposed in sliding guided contact with a pair of vertically disposed guide rails 30 mounted on the opposing surfaces of the intermediate columns 14. A pair of counterweights 32 are affixed to the crosshead 26 and are similarly guided at the upper ends thereof by means of shoes 34 disposed in sliding guided contact with the guide rails 30.

A pair of flexible elements such as a pair of sprocket chains 36 are attached to the upper ends of each of the counterweights 32 and extend vertically therefrom and are trained over a pair of double sprockets 38 rotatably mounted on the longitudinal beam 16. The sprocket chains 36 extend in opposite directions toward opposite ends of the machine and one of the two sprocket chains of each pair is trained respectively over an intermediate single sprocket 40 rotatably mounted on the longitudinal beam 16 above the upper ends of the intermediate columns 14 and thereafter extends downwardly and is affixed to a bracket 42 affixed to the framework of the elevator chassis 18. A second of each of the pairs of sprocket chains 36 extends horizontally from the double sprocket 38 and in turn is trained respectively around an end single sprocket 44 rotatably mounted on the beam 16 above the end columns 12 from which they extend downwardly and similarly are affixed to the brackets 42 adjacent to the end sections of the elevator chassis. In accordance with this arrangement, uniform lifting of the intermediate and end portions of the elevator chassis is achieved in response to the downward movement of the piston rod 24 of the hydraulic cylinder 22 avoiding any skewing or misalignment of the chassis.

The flow of pressurized hydraulic fluid into the rod end and alternatively into the closed end of the hydraulic cylinder is achieved in a well-known manner and is controlled in accordance with a preselected timed sequence as provided by a central control system. Signaling of the control circuit as to the position of the chassis may conveniently be achieved by a down position limit switch indicated at LS1, as shown in FIGURE 1, which is adapted to be tripped by the shoe 34 on the counterweight 32 when the chassis attains the fully lowered position. Similarly, up position of limit switch LS2 is adapted to be tripped by the lower shoe 34 on the counterweight 32 signaling the control circuit that the chassis has attained the fully raised position.

The elevator chassis 18 as exemplarily shown in the drawings comprises a pair of spaced-apart side channels 46 which are interconnected at their ends by arcuate sections 48 and are rigidified by a series of longitudinally spaced transverse members 50. A series of outriggers or lower support members 52 are affixed at longitudinally spaced increments to the outer surface of the side channels 46 and arcuate sections 48 of the elevator chassis to which movable rail sections 54 are adjustably secured. The movable rail sections 54 are adapted to fit in gaps provided between fixed rail sections 56 which are mounted as best seen in FIGURE 3, to lateral braces 58 affixed to the framework of the machine. Accordingly, when the elevator chassis is in the lowered position the movable rail sections 54 and fixed rail sections 56 are disposed in end-to-end alignment providing for continuity of the work supporting rail. Fixed rail sections similar to the fixed rail sections 56 may also be provided in an elevated fixed position if desired to which work carriers are transferred when the chassis is in the elevated position.

A series of work carriers indicated at 60 in FIGURE 3, are movably supported on the fixed and movable rail sections from the lower end of which a suitable work rack 62 having workpieces thereon is suspended. The work rack 62 as shown in FIGURE 3, when in the lowered position, may suitably be immersed in a treating solution or an electroplating solution contained in tanks 64 which are supported on base beams 10. The tanks 64 may be multiple station tanks, for example, wherein the work racks 62 are advanced along the fixed rail sections 56 through each of the treating stations at that tank. In order to effect advancement of the work racks 62 to the next adjacent tank and over the partition separating adjoining treating receptacles, the work racks 62 are raised by the movable rail sections in response to the ascending movement of the elevator chassis whereupon they can be advanced while in a raised position over the intervening tank partition.

In the exemplary conveying apparatus shown, the fixed rail sections and movable rail sections are arranged in a continuous circuit comprising two straight side sections connected at their ends by arcuate turnaround sections. In accordance with this arrangement, the work racks are loaded at one station and are advanced along the rail sections through each of the treating stations and are thereafter unloaded at an unload station adjacent to the load station. The present invention, however, is equally applicable to machines of the so-called "straight through" type wherein the work racks are loaded at one end of the machine and are unloaded at the opposite end thereof after completing a prescribed treating sequence.

Figure 4:
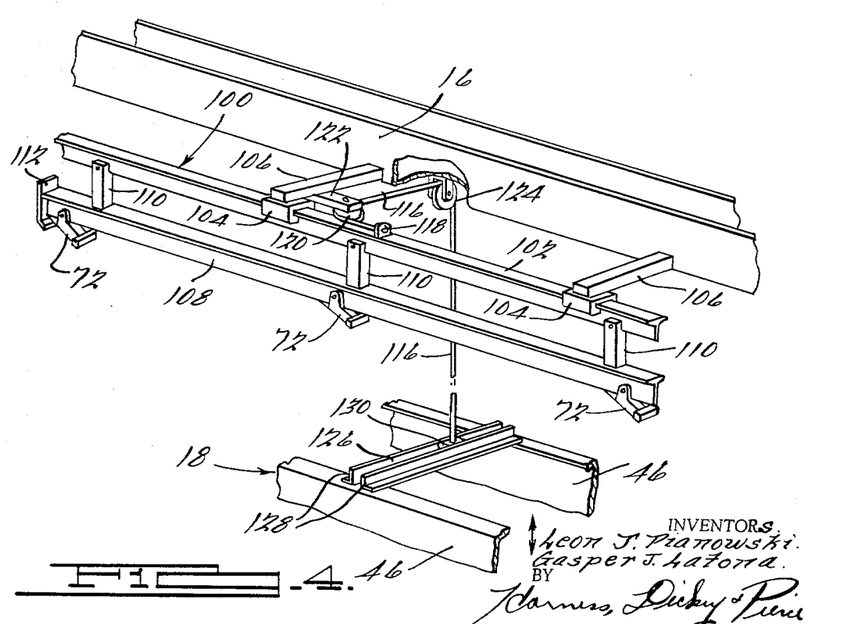
FIGURE 4 is a fragmentary perspective view of the vertically fixed pusher section connected to the machine framework.

In either event, intermittent advancement of the work carriers 60 and the work racks 62 suspended therefrom along the fixed and movable rail sections is achieved by a reciprocable pusher mechanism which operates in coordinated relationship with the ascending and descending movement of the elevator chassis. The principal portion of the pusher mechanism is carried by the elevator chassis and is movable therewith to and from the raised position and the lowered position. One section thereof, as illustrated in FIGURES 1, 3, and 4, is movably mounted on the machine framework in a vertically fixed position for the purposes subsequently to be described. The movable pusher mechanism as shown in the drawings, consists of a pair of longitudinally extending pusher bars 66 which are of a T-shaped cross section and are slidably disposed in shoes 68 affixed to lateral members 70 attached at longitudinally spaced increments to the side channels 46 of the elevator chassis 18. The pusher bars 66 extend above and in alignment with the movable rail sections 54 and fixed rail sections 56. A series of engaging members or pusher dogs 72 are pivotally connected at spaced intervals to the depending web of the pusher bars 66 which are adapted to engage the upper end portions of the work carriers 60 during the advancing movement of the pusher bars. The pusher dogs 72 are formed with a stop indicated at 74 in FIGURE 1 which is adapted to engage the lower edge of the depending web of the pusher bar preventing pivoting movement of the pusher dog during its advancing movement or toward the right as viewed in FIGURE 1. During the retracting movement of the pusher bar corresponding to a direction toward the left as viewed in FIGURE 1, the pusher dog pivots on coming in contact with the upper end portion of a work carrier enabling further retraction of the pusher bar without disturbing the position of the work carrier on the supporting rail whereupon the pusher dogs slide across the top of the work carriers and drop down preparatory of the next advancing movement.

Advancement of the work carriers around the arcuate rail sections 76 mounted at the ends of the exemplary machine shown in FIGURES 1 and 2 is achieved by a sector plate 78 rotatably mounted on a vertical shaft 80 which is journaled at each of the elevator chassis at substantially the center of arcuate curvature of the arcuate supporting rail section 76. Pusher dogs 72 are mounted at spaced intervals along the periphery of each sector plate 78 and depends from a bracket 82 connected to the sector plate wherein the engaging portion of the pusher dog is disposed directly above the upper surface of the arcuate supporting rail section 76. In accordance with this arrangement, continuity in the transfer of workpieces along the fixed and movable straight rail sections and the arcuate turnaround rail sections is achieved.

Intermittent reciprocation of the pusher bars 66 and intermittent oscillation of the sector plates 78 is achieved by means of a double-acting fluid actuated transfer cylinder 84 which is mounted adjacent to one end of the elevator chassis, as best seen in FIGURES 1 and 2. The closed end of the transfer cylinder 84 is pivotally connected to a transverse member 50 on the chassis, and the end of the piston rod 86 is pivotally connected by means of a pin 88 to the sector plate 78. The sector plate 78 and the pusher bars 66 are shown in the retracted position in FIGURE 2. The introduction of pressurized fluid into the blank end of the transfer cylinder 84, effects outward movement of its piston rod 86, causing a counterclockwise rotation of the sector plate 78 as viewed in FIGURE 2 and movement thereof from the fully retracted position toward the advance position. Corresponding longitudinal reciprocation of the pusher bars 66 along each of the straight side sections of the machine is achieved by link arms 90 having one of their ends pivotally connected to the sector plate and the other ends thereof pivotally connected to a shoe 89 slidably mounted on a guide rail 91 and which shoe is in turn connected to the end portion of the pusher bar. Accordingly, concurrent advancement of the work racks along the straight side sections of the machine and the arcuate turnaround sections is achieved in response to the outward movement of the piston rod of the transfer cylinder. Conversely, the introduction of pressurized fluid into the rod end of the transfer cylinder 84 effects movement of the sector plate in a clockwise direction as viewed in FIGURE 2, effecting movement thereof and movement of the pusher bars connected thereto from the fully advanced position to the retracted position.

The reciprocating movement of the pusher mechanism is coordinated with the vertical travel of the elevator chassis by means of a rearward transfer limit switch LS3, as shown in FIGURE 1, which is mounted on the elevator chassis and is adapted to be actuated by a suitable actuator 92 affixed to and movable with the pusher bar 66 when the pusher mechanism attains the fully retracted position. On movement of the pusher mechanism toward the advanced position, the actuator 92 releases rearward limit switch LS3 and actuates forward position limit switch LS4 when the fully advanced position is attained. Accordingly, the control circuit of the machine is signalled which in turn halts the flow of pressurized fluid to the transfer cylinder 84.

In accordance with the construction of the conveying machine as hereinabove described, it will be apparent that the pusher mechanism is operative to effect advancement of the work carriers when the elevator chassis is in the fully raised position along the movable rail sections carried by the chassis as well as along fixed and independently movable rail sections which are positioned in a raised position. No advancement of those work carriers occur which are positioned on the fixed rail sections disposed in a lowered position such as the fixed rail section 56 illustrated in FIGURE 3 when the chassis is in the raised position. On the other hand, when the chassis is in the fully lowered position advancement of the pusher mechanism effects advancement of the work carriers on the movable rail sections carried by the elevator chassis as well as along the fixed rail sections disposed in a lowered position above the treating tanks.

In order to shorten the operating cycle of the conveying machine and achieve optimum efficiency, it is conventional to advance the pusher mechanism when the chassis is stationarily positioned in the fully raised and in the fully lowered position and to retract the pusher mechanism during the vertical travel of the elevator chassis between these two moved positions. By so doing, the pusher mechanism is in the fully retracted position when the chassis attains either of its moved positions whereby transfer can be accomplished without any further time delay necessitated by the retraction of the pusher mechanism.

It is frequently desirable in machines of this type to provide for variations in the processing sequence of successive workpieces providing thereby increased versatility in the machine. This can be achieved, for example, by providing a vertically fixed rail section or alternatively, a rail section such as the section 94 shown in FIGURES 1 and 3, which is movable independently of the elevator chassis providing thereby a skip operation, a delay dip operation, or an early pickup operation of the workpieces at that particular station. In a skip operation, for example, the rail section 94 is maintained in the raised position whereby the work carrier having its upper hook portion indicated at 96 engaged thereon is retained in the elevated position and the workpieces omit treatment at the treating station disposed therebelow. Alternatively, the rail section 94 can be lowered along its upright frame 98 a preselected time period after the elevator chassis has been lowered providing a delay dip operation wherein a shortened treatment duration is provided for those workpieces. In either event, it will be apparent that the independent movement of the rail section 94 is susceptible to causing interference between itself and the elevator chassis as it initiates its lowering movement. To avoid such an obstruction, the pusher mechanism along the section or length of the rail section 94 is segmented enabling the elevator chassis to pass freely in spite of the raised position of the rail section 94. In order to provide for continuity in the transfer of workpieces along the several rail sections and to and from the rail section 94, a pusher section 100 as illustrated in FIGURES 1-4 is provided which is slidably mounted on the framework of the machine in a fixed elevated position.

The pusher section 100 comprises a framework including an elongated member 102 of a T-shaped cross section which is slidably mounted in a pair of longitudinally spaced shoes 104 affixed to lateral extending braces 106 connected to the longitudinal beam 16 of the machine framework. A T-shaped pusher bar section 108 is rigidly suspended from the elongated member 102 by means of a series of vertical braces 110. A series of pusher dogs 72 are pivotally supported from the depending web of the pusher bar section 108 in the same manner as and for the same purposes as previously described. The left end of the pusher bar section 108, as viewed in FIGURES 1 and 4, is formed with an abutment plate 112 which is adapted to be disposed in face-to-face abutting relationship with an abutment plate 114 affixed to the adjacent end of the principal pusher bar 66 as shown in FIGURE 1 when the elevator chassis is in the fully raised position. The lower end of the abutment plate 112 and the upper end of the abutment plate 114 are preferably provided with an angular contour to provide a separating camming action in the event slight misalignment between the respective ends of the pusher bar section and principal pusher bar exists avoiding thereby interference during the ascending movement of the elevator chassis. When the elevator chassis is in the fully raised position and with the pusher bar section and principal pusher bar in the fully retracted positions, the abutment plates 112, 114 are disposed in appropriate end-to-end abutting relationship whereupon the advancing movement of the pusher mechanism in response to the actuation of the transfer cylinder 84 effects concurrent advancement of the pusher bar section and movement of the work racks along the rail section 94. The elevator chassis thereafter descends during which movement the pusher mechanism is retracted.

The retraction of the pusher bar section independently of the principal transfer mechanism is achieved in accordance with one embodiment of the present invention as shown in FIGURES 1-4, in response to the vertical travel of the elevator chassis. In accordance with the arrangement illustrated, a flexible element such as a chain 116 is connected at one of its ends to a bracket 118 affixed to the upper surface of the elongated member 102. The chain 116 extends longitudinally of the member 102 and is trained around a pulley 120 which is rotatably mounted for rotation about a substantially vertical axis on a bracket 122 affixed to the lateral brace 106. The chain thereafter extends and is trained around a second pulley 124 rotatably secured to the machine framework for rotation about a horizontal axis. The chain passes downwardly and extends in clearance relationship through an aperture 126 in a cross member 128 of the elevator chassis. A suitable block 130 is affixed to the lower end portion of the chain 116 and is operable to engage the lower surface of the cross member 128 in response to at least a portion of the descending travel of the elevator chassis.

The positioning of the engaging block 130 on the chain 116 is dictated in accordance with the relative length of vertical travel of the elevator chassis in comparison to the length of reciprocating travel of the pusher bar section between the advanced and retracted position. Accordingly, engagement of the block 130 with the elevator chassis occurs during the balance of the vertical travel of the elevator chassis corresponding to the length of the retracting movement of the pusher bar section. In a specific situation wherein the vertical travel of the elevator chassis corresponds to the longitudinal displacement of the pusher bar section, the engaging block will engage the elevator chassis throughout its descending movement. More frequently, the vertical travel of the elevator chassis is greater than the longitudinal movement of the pusher bar section such that lost motion is provided whereby the engaging block is engaged during only the latter portion of the descending movement of the chassis. It is also contemplated however that appropriate gear trains and reduction ratios can be incorporated so as to provide the requisite retracting stroke of the pusher bar section in response to a preselected vertical movement of the elevator chassis.

Operation of the conveying machine including the transfer mechanism and the push bar section will now be described in accordance with the construction as illustrated in FIGURES 1-4. With the elevator chassis in the fully raised position, as signaled by the tripping of up-position limit switch LS2, the central control circuit effects energization of the transfer cylinder 84 whereupon the pusher bar 66 and sector plates 78, commence their advancing movement. The coaction between abutment plates 112, 114 effects concurrent advancing movement of the pusher bar section 108 toward the fully advanced position. Work carriers engaged by the pusher dogs 72 on the rail section 94 as well as the movable rail sections 54 carried by the chassis are accordingly advanced to a position above the next adjacent treating station. As the pusher bar 66 approaches the fully advanced position, the actuator 92 thereon trips forward transfer limit switch LS4 signaling the central control circuit of the advancing movement and halting the flow of pressurized fluid to the blank end of the transfer cylinder 84.

Thereafter, pressurized fluid is admitted into the rod end of the left cylinder 22 whereupon the chassis commences its descending movement. During the descending movement of the chassis, the transfer cylinder 84 is again actuated whereupon the pusher bars and sector plates are returned to the fully retracted position as signalled by the tripping of rearward limit switch LS3. During the descending movement of the elevator chassis and independently of the transfer cylinder 84, the engagement block 130 is engaged by the cross member 128 effecting a retraction of the pusher bar section 108 from the fully advanced position to the fully retracted position.

When the chassis approaches the fully lowered position, down position limit switch LS1 is tripped signaling the central control circuit whereby the flow of pressurized fluid into the rod end of the lift cylinder is halted. The elevator chassis remains in the fully lowered position for a preselected down dwell period as established by a suitable dwell timer incorporated in the central control circuit for providing a requisite treatment time of the work racks suspended in the treating solutions. At the completion of the preselected down dwell period, as signaled by the timing out of the down dwell timer, the transfer cylinder 84 is again energized effecting movement of the pusher mechanism from the fully retracted position to the fully advanced position. Deenergization of the transfer cylinder is effected upon the tripping of forward limit switch LS4 by the actuator 92 on the pusher bar. The tripping of limit switch LS4 signals the central control circuit that the transfer movement has been completed whereupon pressurized fluid is directed into the blank end of the lift cylinder 22 whereupon the elevator chassis commences its ascending movement. Concurrently, the transfer cylinder 84 is again actuated effecting retraction of the pusher mechanism during the ascent of the elevator chassis. Deenergization of the transfer cylinder 84 is achieved when rearward position limit switch LS3 is actuated by the actuator 92.

The retracting movement of the principal pusher mechanism is accomplished before the elevator chassis attains the raised position such that the abutment plate 114 at the end of the pusher bar is disposed in approximate vertical alignment with the abutment plate 112 on the end of the pusher bar section 108. At the completion of the ascending movement of the elevator chassis as signaled by the tripping of up-position limit switch LS2, the transfer cylinder 84 is again energized and the cycle as hereinbefore described is repeated whereupon work carriers are advanced onto and off the ends of the rail section 94 by the principal pusher mechanism and by the pusher section.

Figure 5:
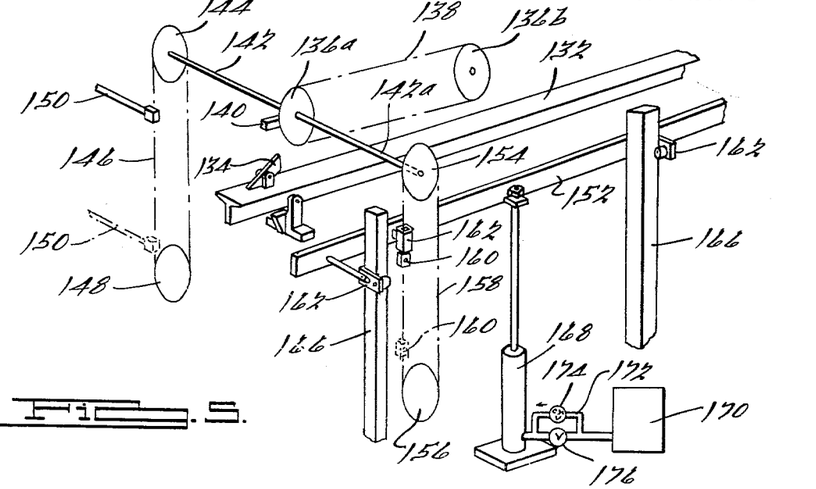
FIGURE 5 is a diagrammatic perspective view of an alternative satisfactory mechanical arrangement for effecting retraction of the second pusher section in response to the vertical travel of the elevator chassis.

An alternative satisfactory mechanism for effecting retracting movement of the pusher bar section is diagrammatically illustrated in FIGURE 5. In the arrangement as shown in FIGURE 5, a pusher bar section 132 which is slidably supported on the machine frame (not shown), is provided with a pivotally mounted flipper dog 134 on the upper surface thereof. A pair of pulleys 136a, 136b are rotatably supported in longitudinally spaced relationship above the pusher bar section 132 around which a continuous flexible element such as a sprocket chain 138 is trained. An engaging dog 140 is attached to one of the links and is movable in response to the sprocket chain 138.

Longitudinal movement of the sprocket chain 138 is achieved by rotation of the pulley 136a which is affixed to a cross shaft 142 which in turn is coupled to a driving sprocket 144. A second continuous chain 146 is trained around the driving sprocket 144 and about an idler sprocket 148 vertically spaced below the driving sprocket 144. A bracket 150 is affixed to the chain 146 which in turn is connected to the elevator chassis and is movable in response to the ascending and descending movement thereof.

Figures 6, 7, 8, 9:
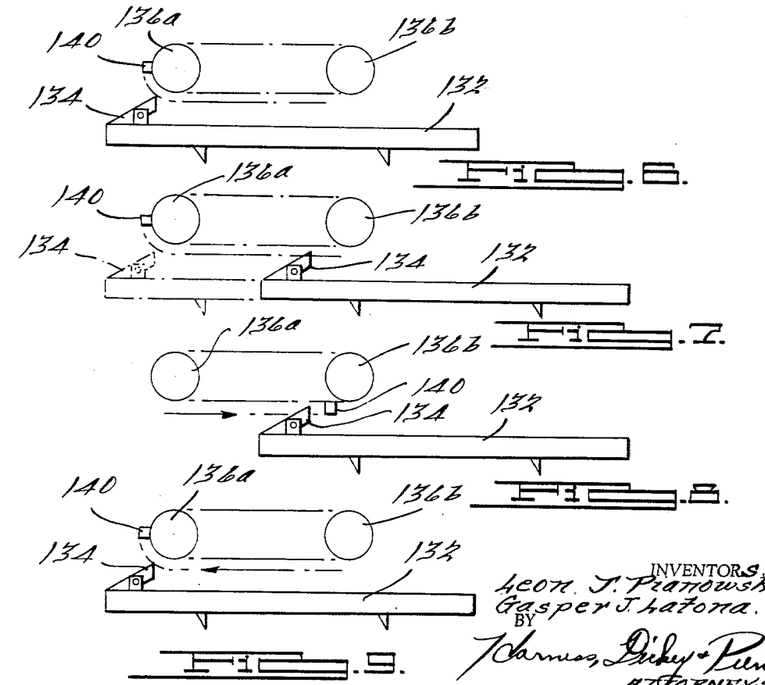
FIGURES 6 through 9 are diagrammatic side elevational views of the second pusher section as shown in FIGURE 5 and illustrating the relative positions and cooperation between the components thereof during a conventional operating sequence.

The operation of the alternative satisfactory arrangement illustrated in FIGURE 5 will now be described with particular reference to the diagrammatic drawings shown in FIGURES 6 through 9. The pusher bar section 132 is shown in FIGURE 6 in the fully retracted position with the elevator chassis in the fully raised position corresponding to the relationship of the components as shown in solid lines in FIGURE 5. Movement of the pusher bar section from the fully retracted position as shown in FIGURE 6 to an advanced position as shown in FIGURE 7 while the chassis is in a stationary raised position is achieved in response to the advancing movement of the principal pusher mechanism in accordance with the actuation of the transfer cylinder as previously described.

At the completion of the advancing movement of the pusher bar section 132, the elevator chassis commences its descending movement whereupon the bracket 150 causes the chain 146 to rotate the driving sprocket 144 effecting a counterclockwise rotation of the pulley 136a and a corresponding movement of the sprocket chain 138 and engaging dog 140 thereon from the position shown in FIGURE 7 to the position shown in FIGURE 8. As the engaging dog passes over the upper surface of the flipper dog 134, the flipper dog pivots downwardly enabling unobstructed passage of the engaging dog thereover. At the completion of the descending movement of the elevator chassis, the relationship of the several components are as illustrated in FIGURE 8 and the bracket 150 has attained the position as illustrated in phantom in FIGURE 5. At the completion of the down dwell period, the elevator chassis again commences its ascending travel whereupon the arriving sprocket 144 effects rotation of the pulley 136a in a clockwise direction as viewed in FIGURE 9 causing movement of the pusher bar section from the advanced position as shown in FIGURE 8 to the fully retracted position as shown in FIGURE 9. Accordingly, retraction of the independently movable pusher bar section is achieved in response to the vertical travel of the elevator chassis in a direct mechanical coordination with the operating sequence of the machine obviating the need for any ancillary drive and control systems.

It is also contemplated in accordance with the present invention that the embodiment illustrated in FIGURE 5 can be employed for effecting lifting movement of an independently movable rail section indicated at 152 in FIGURE 5. In accordance with the arrangement as schematically shown, the cross shaft 142 is formed with an extension 142a to the end of which a driven sprocket 154 is affixed and drivingly coupled thereto. A second idler sprocket 156 is rotatably supported in vertically spaced relationship below the driven sprocket 154. A lift chain 158 is trained around the driven sprocket 154 and idler sprocket 156 and is formed with a bracket 160. The bracket 160 is adapted to engage the lower surface of a block 162 through which the lift chain 158 freely slides effecting a raising of the block in response to lifting movement of the bracket 160. The block 162 in turn is connected to the independently movable rail section 152 which may suitably be supported for vertical movement by means of roller brackets 162 mounted in guided movement on upright columns 166.

The independently movable rail section 152 may be conveniently retained in the raised position by a hydraulic cylinder 168 mounted with its closed end on a stationary platform and with its rod end connected to a suitable bracket on the movable rail section 152. During the ascending movement of the movable rail section in response to the lifting movement of the lift chain 158, hydraulic fluid is drawn into the blank end of the cylinder 168 from a fluid reservoir 170 and through a bypass line 172 incorporating a check valve 174 therein. Entrapment of the hydraulic fluid within the cylinder prevents lowering movement of the lift rail after the elevator chassis is lowered.

Selected lowering of the independently movable rail section at a preselected time period after the elevator chassis has been lowered can conveniently be achieved either manually, remotely, or automatically such as by a suitable timer mechanism in the central control circuit which is operable to energize a solenoid-actuated valve 176 in a line between the cylinder and fluid reservoir enabling a controlled bleed of hydraulic fluid from the cylinder and a gravitational controlled descent of the movable rail section and work racks supported thereon. By virtue of the mechanism as described in FIGURE 5, selected skip, and delay dip operation can be simply achieved without the necessity of providing independent pumping means for supplying hydraulic fluid to the hydraulic cylinder 168.

While it will be apparent that the preferred embodiments of the invention disclosed are well calculated to fulfill the objects above stated, it will be appreciated that the invention is susceptible to modification, variation, and change without departing from the proper scope or fair meaning of the subjoined claims.

What is claimed is:

1. A conveying apparatus comprising a framework, an elevator chassis movably mounted on said framework, means for moving said chassis to and from a raised position and a lowered position, alignable supporting rail sections on said framework and said chassis for supporting work carriers movably mounted thereon, reciprocable pusher means for intermittently advancing the work carriers along said rail sections including a first pusher section reciprocably mounted on said chassis and a second pusher section reciprocably mounted in a vertically fixed position on said framework, said first and said second pusher sections positioned in end-to-end abutting alignment in one of the moved positions of said chassis, means drivingly connected to said first pusher section for effecting reciprocation thereof to and from an advanced position and a retracted position, said first pusher section operable for moving said second pusher section to said advanced position when in aligned position with said first pusher section, and means connected to said second pusher section and to said chassis and operable in response to movement of said chassis from one of the moved positions to the other moved position of said chassis for moving said second pusher section to a retracted position.

2. A conveying apparatus comprising a framework, an elevator chassis movably mounted on said framework, means for moving said chassis to and from a raised position and a lowered position, alignable supporting rail sections on said framework and said chassis for supporting work carriers movably mounted thereon, reciprocable pusher means for intermittently advancing the work carriers along said rail sections including a first pusher section reciprocably mounted on said chassis and a second pusher section reciprocably mounted in a vertically fixed position on said framework, said first and said second pusher sections positioned in end-to-end abutting alignment in one of the moved positions of said chassis, means drivingly connected to said first pusher section for effecting reciprocation thereof to an advanced position when said chassis is in said moved positions and for moving said second pusher section to a retracted position during the vertical travel of said chassis, said first pusher section operable for moving said second pusher section to said advanced position when in aligned position with said first pusher section, and means connected to said second pusher section and to said chassis and operable in response to movement of said chassis from one of the moved positions to the other moved position of said chassis for moving said second pusher section to a retracted position independently of said first pusher section.

3. A conveying apparatus comprising a framework, an elevator chassis movably mounted on said framework, means for moving said chassis to and from a raised position and a lowered position, alignable supporting rail sections on said framework and said chassis for supporting work carriers movably mounted thereon, reciprocable pusher means for intermittently advancing the work carriers along said rail sections including a first pusher section reciprocably mounted on said chassis, and a second pusher section reciprocably mounted in a vertically fixed position on said framework, said first and said second pusher sections positioned in end-to-end abutting alignment in one of the moved positions of said chassis, means drivingly connected to said first pusher section for effecting reciprocation thereof to and from an advanced position and a retracted position, said first pusher section operable for moving said second pusher section to said advanced position when in aligned position with said first pusher section, and retracting means operable in response to movement of said chassis for retracting said second pusher section independently of said first pusher section, said retracting means comprising a flexible element having one end thereof connected to said second pusher section and the other end thereof engageable to said chassis during its vertical travel in one direction effecting retraction of said second pusher mechanism in response to movement of said chassis in said one direction.

4. A conveying apparatus comprising a framework, an elevator chassis movably mounted on said framework, means for moving said chassis to and from a raised position and a lowered position, alignable supporting rail sections on said framework and said chassis for supporting work carriers movably mounted thereon, reciprocable pusher means for intermittently advancing the work carriers along said rail sections including a first pusher section reciprocably mounted on said chassis, and a second pusher section reciprocably mounted in a vertically fixed position on said framework, said first and said second pusher sections positioned in end-to-end abutting alignment in one of the moved positions of said chassis, means drivingly connected to said first pusher section for effecting reciprocation thereof to and from an advanced position and a retracted position, said first pusher section operable for moving said second pusher section to said advanced position when in aligned position with said first pusher section, and retracting means operable in response to movement of said chassis for retracting said second pusher section independently of said first pusher section, said retracting means comprising a flexible element having one end thereof connected to said second pusher section, pulley means for movably supporting said flexible element and providing for guided travel of the opposite end portion thereof in alignment with the vertical path of travel of said chassis, and means on said opposite end portion of said flexible element engageable by said chassis for effecting a retracting movement of said second pusher section from said advanced to said retracted position in response to at least a portion of the vertical travel of said chassis in one direction.

5. A conveying apparatus comprising a framework, an elevator chassis movably mounted on said framework, means for moving said chassis to and from a raised position and a lowered position, alignable supporting rail sections on said framework and said chassis for supporting work carriers movably mounted thereon, reciprocable pusher means for intermittently advancing the work carriers along said rail sections including a first pusher section reciprocably mounted on said chassis, and a second pusher section reciprocably mounted in a vertically fixed position on said framework, said first and said second pusher sections positioned in end-to-end abutting alignment in one of the moved positions of said chassis, means drivingly connected to said first pusher section for effecting reciprocation thereof to and from an advanced position and a retracted position, said first pusher section operable for moving said second pusher section to said advanced position when in aligned position with said first pusher section, and retracting means operable in response to movement of said chassis for retracting said second pusher section independently of said first pusher section, said retracting means comprising a pulley, a continuous element trained around said pulley and drivingly coupled to said chassis, a shaft connected to said pulley, a second pulley drivingly coupled to said shaft, a second continuous element trained around said second pulley, engaging means on said second continuous element operable to engage said second pusher mechanism, said engaging means operable to engage and retract said second pusher section in response to rotation of said shaft by said first flexible element in response to the vertical travel of said chassis in one direction.

6. A conveying apparatus comprising a framework, an elevator chassis movably mounted on said framework, means for moving said chassis to and from a raised position and a lowered position, alignable supporting rail sections on said framework and said chassis for supporting work carriers movable mounted thereon, reciprocable pusher means for intermittently advancing the work carriers along said rail sections including a first pusher section reciprocably mounted on said chassis, and a second pusher section reciprocably mounted in a vertically fixed position on said framework, said first and said second pusher sections positioned in end-to-end abutting alignment in one of the moved positions of said chassis, means drivingly connected to said first pusher section for effecting reciprocation thereof to and from an advanced position and a retracted position, said first pusher section operable for moving said second pusher section to said advanced position when in aligned position with said first pusher section, and retracting means operable in response to movement of said chassis for retracting said second pusher section independently of said first pusher section, said retracting means comprising a first element extending longitudinally of said second pusher section, means for movably supporting said first element, coacting means on said first element and said second pusher section operable for drivingly coupling said second pusher section to said first element during the retracting travel of said first element, and means drivingly coupled to said first element effecting movement thereof and said coacting means thereon to and from a retracted position and an advanced position longitudinally along said second pusher section in response to the vertical ascending and descending movement of said chassis.

7. A conveying apparatus comprising a framework, an elevator chassis movably mounted on said framework, means for moving said chassis to and from a raised position and a lowered position, alignable supporting rail sections on said framework and said chassis for supporting work carriers movably mounted thereon, reciprocable pusher means for intermittently advancing the work carriers along said rail sections including a first pusher section reciprocably mounted on said chassis, and a second pusher section reciprocably mounted in a vertically fixed position on said framework, said first and said second pusher sections positioned in end-to-end abutting alignment in one of the moved positions of said chassis, means drivingly connected to said first pusher section for effecting reciprocation thereof to and from an advanced position and a retracted position, said first pusher section operable for moving said second pusher section to said advanced position when in aligned position with said first pusher section, and retracting means operable in response to movement of said chassis for retracting said second pusher section independently of said first pusher section, said retracting means comprising a continuous sprocket chain having one flight thereof extending longitudinally of said second pusher section, a pair of longitudinally spaced-apart sprockets for supporting said sprocket chain, a pusher dog connected to said sprocket chain, a flipper dog on said second pusher section engageable by said pusher dog during the retracting movement of said chain and disengageable with said pusher dog during the advancing movement of said chain, and drive means drivingly coupled to said chain providing for movement thereof to and from the advanced and the retracted position in response to the ascending and descending movement of said chassis.

8. A conveying apparatus comprising a framework, an elevator chassis movably mounted on said framework, means for moving said chassis to and from a raised position and a lowered position, alignable supporting rail sections on said framework and said chassis for supporting work carriers movably mounted thereon, an auxiliary rail section selectively movable from a raised position to a lowered position independently of said chassis, reciprocable pusher means for intermittently advancing the work carriers along said rail sections including a first pusher section reciprocably mounted on said chassis and a second pusher section reciprocably mounted in a raised position on said framework for advancement of the work carriers along said auxiliary rail section, said first and said second pusher sections positioned in end-to-end abutting alignment when said chassis is in said raised position, means drivingly connected to said first pusher section for effecting reciprocation thereof to and from an advanced position and a retracted position, said first pusher section operable for moving said second pusher section to said advanced position when in aligned position with said first pusher section, retracting means operatively connected to said elevator chassis and operable in response to movement of said chassis from the raised position to the lowered position for moving said second pusher section to a retracted position independently of said first pusher section, and auxiliary lift means drivingly coupled to said retracting means and operable to move said auxiliary rail section from the lowered position to the raised position in response to the ascending movement of said chassis.

References Cited by the Examiner
UNITED STATES PATENTS

| | | | |
|---|---|---|---|
| 2,990,071 | 6/1961 | Davis | 198—19 |
| 3,024,794 | 3/1962 | Chill | 214—89 |

SAMUEL F. COLEMAN, *Primary Examiner.*